(12) United States Patent
Duan

(10) Patent No.: US 9,072,105 B2
(45) Date of Patent: Jun. 30, 2015

(54) INTERFERENCE-CONTROL METHOD AND FEMTO BASE STATION

(75) Inventor: Jinsong Duan, Kanagawa (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 444 days.

(21) Appl. No.: 13/389,879

(22) PCT Filed: Aug. 18, 2010

(86) PCT No.: PCT/JP2010/005099
§ 371 (c)(1),
(2), (4) Date: Feb. 10, 2012

(87) PCT Pub. No.: WO2011/021387
PCT Pub. Date: Feb. 24, 2011

(65) Prior Publication Data
US 2012/0142364 A1  Jun. 7, 2012

(30) Foreign Application Priority Data
Aug. 19, 2009 (JP) ................................. 2009-190432

(51) Int. Cl.
*H04W 72/00* (2009.01)
*H04W 72/08* (2009.01)
(Continued)

(52) U.S. Cl.
CPC ............ *H04W 72/082* (2013.01); *H04W 8/005* (2013.01); *H04W 28/048* (2013.01); *H04W 52/244* (2013.01); *H04W 72/0453* (2013.01); *H04W 84/045* (2013.01)

(58) Field of Classification Search
CPC ............ H04W 28/048; H04W 52/244; H04W 72/0453; H04W 72/082; H04W 84/045; H04W 8/005

USPC ........... 455/455, 450, 550.1, 556.2, 436, 444, 455/561; 370/328–332, 338
See application file for complete search history.

(56) References Cited

U.S. PATENT DOCUMENTS 7,142,861 B2* 11/2006 Murai ........................... 455/444
8,694,044 B2*  4/2014 Hiltunen et al. .............. 455/522
(Continued)

FOREIGN PATENT DOCUMENTS

CN        1448038 A    10/2003
CN      101449606 A     6/2009
(Continued)

OTHER PUBLICATIONS

Tomoya Tandai, et al., "A study on cognitive radio system coexisting with macro cellular communication systems", IEICE Technical Report SR2005-71, Feb. 23, 2006, Passage 3.
(Continued)

*Primary Examiner* — Babar Sarwar
(74) *Attorney, Agent, or Firm* — Pearne & Gordon LLP

(57) ABSTRACT

Provided are an interference-control method and femto base station whereby inter-cell interference between a femtocell and a macrocell is decreased without a loss in throughput or coverage of the femto base station. A nearby-macro-terminal detection unit (306) in the femto base station (103) detects whether there are any macro terminals (102) within communication range of the femto base station (103) that are not registered with the femto base station (103). If a macro terminal (102) is detected, an interference-control unit (307) controls interference by either decreasing the total transmission power of the femto base station (103) or allocating, to femto terminals (104) registered with the femto base station (103), frequencies that differ from the frequency used by the macro base station (101).

11 Claims, 10 Drawing Sheets

(51) Int. Cl.
*H04W 52/24* (2009.01)
*H04W 8/00* (2009.01)
*H04W 28/04* (2009.01)
*H04W 72/04* (2009.01)
*H04W 84/04* (2009.01)

(56) References Cited

U.S. PATENT DOCUMENTS

| | | | |
|---|---|---|---|
| 8,717,983 B2* | 5/2014 | Wei et al. | 370/329 |
| 2003/0171124 A1 | 9/2003 | Kataoka | |
| 2007/0270151 A1* | 11/2007 | Claussen et al. | 455/444 |
| 2009/0042594 A1 | 2/2009 | Yavuz et al. | |
| 2009/0042596 A1 | 2/2009 | Yavuz et al. | |
| 2010/0008294 A1* | 1/2010 | Palanki et al. | 370/328 |
| 2010/0008315 A1* | 1/2010 | Palanki et al. | 370/329 |
| 2010/0008317 A1* | 1/2010 | Bhattad et al. | 370/329 |
| 2010/0222068 A1* | 9/2010 | Gaal et al. | 455/450 |
| 2010/0238885 A1* | 9/2010 | Borran et al. | 370/329 |
| 2010/0279703 A1 | 11/2010 | Morita et al. | |
| 2011/0217974 A1* | 9/2011 | Naka et al. | 455/423 |

FOREIGN PATENT DOCUMENTS

| | | |
|---|---|---|
| CN | 101472317 A | 7/2009 |
| CN | 101724677 A | 6/2010 |
| JP | 2009-524043 A | 6/2009 |
| JP | 2010-130693 A | 6/2010 |
| WO | 02/104056 A1 | 12/2002 |
| WO | 2007139680 A2 | 12/2007 |
| WO | 2009/072355 A1 | 6/2009 |

OTHER PUBLICATIONS

International Search Report for PCT/JP2010/005099 dated Oct. 19, 2010.

Search Report issued in Chinese Patent Application No. 201080035713.1 dated Dec. 24, 2013.

* cited by examiner $$TX_{MUE} \approx P_{O\_NOM} + PL_{MUE-MNB} + MUE_{MCS} + MUE_{(BW)} \quad \cdots \text{(NUMERICAL EXPRESSION 1)}$$

$$IP_{MUE-HNB} \approx P_{O\_NOM} + (PL_{MUE-MNB} - PL_{MUE-HNB}) + MUE_{MCS} + MUE_{(BW)} \quad \cdots \text{(NUMERICAL EXPRESSION 2)}$$

$$PL_{MUE-HNB} \approx P_{O\_NOM} + PL_{MUE-MNB} + MUE_{MCS} + MUE_{(BW)} - IP_{MUE} \quad \cdots \text{(NUMERICAL EXPRESSION 3)}$$

$$PL_{MUE-HNB} <= TH_{HNB\_MUE\_Hole} = 80dB \quad \cdots \text{(NUMERICAL EXPRESSION 4)}$$

FIG.5

INTERFERENCE-CONTROL METHOD AND FEMTO BASE STATION

TECHNICAL FIELD

The present invention relates to an interference control method and femto base station.

BACKGROUND ART

Studies are actively underway to introduce a ultra-compact wireless base station apparatus (hereinafter, referred to as a "femto base station (HNB)") into a cellular system as typified by wideband code division multiple Access (WCDMA) or long term evolution (LTE). By setting the femto base station in the buildings such as general households or offices where a propagation environment is coarse and covering an area within several meters in radius, it is expected to realize higher-speed wireless transmission within a femto base station setting area.

In an existing cellular system, it is presumed that the urban area uses overall operational frequency bands. For this reason, it is difficult to obtain a frequency band dedicated to the femto base station. Therefore, upon introducing the femto base station, it is effective to share a frequency between the existing macro base station (macro node B (MNB)) and the femto base station. In addition, it is also anticipated that an access limiting function based on closed subscriber group (CSG) where only a user setting the femto base station can communicate by using the femto base station is supported.

If the femto base station is introduced into the existing cellular system under this condition, downlink cross interference from the femto base station to the existing macro terminal or downlink cross interference from the existing macro base station (MNB) to the femtocell user (that is, femto terminal (home user equipment (HUE)) becomes a problem. Particularly, in the LTE system, since a high-speed bit-rate transmission is performed using the downlink data channel (PDSCH), the base station performs maximum power transmission in the downlink. Therefore, the interference problem in the downlink of the LTE system is serious. That is, a user of the femto base station installed in the vicinity of the macro base station suffers significant interference from the macro base station. Meanwhile, a macrocell user located in the vicinity of the femto base station provided near the cell edge of the macro base station suffers significant interference from the femto base station. In the downlink of the LTE system, a multiple access scheme such as OFDMA is employed. In the OFDMA system, interference is generated when the frequency resource block (frequency RB) allocated to the macro base station and the frequency RB allocated to the femto base station at least partially overlap. The magnitude of this interference varies depending on relative position between the macro base station and the femto base station.

Patent Literatures 1 and 2 disclose the common use of frequency between the existing macro base station and femto base station described above. Patent Literatures 1 and 2 disclose that when the macro base station and the femto base station share the frequency, the transmission power of the femto base station is fixed and is not controlled. The literatures further disclose that in such a case the macrocell throughput may be significantly deteriorated. Regarding this problem, the following technique has been proposed. That is, assuming a WCDMA system as a 3G mobile communication system, the transmission power of the femto base station is determined in accordance with the CPICH reception power from the macro base station having the largest reception power of the common pilot channel (CPICH) and the path loss that the femto base station of itself desires to obtain (for example, see Patent Literature 1).

Specifically, in the femto base station disclosed in Patent Literature 1, the transmission power is controlled as follows. That is, first, the femto base station measures the reception power of CPICH transmitted from each macro base station and calculates the initial transmission power based on the largest CPICH reception power. Then, the femto base station makes the femto terminal to measure the reception power of the pilot transmitted from the femto base station or the path loss from the femto base station to the femto terminal and to report the measurement result. In addition, the femto base station adjusts the transmission power, by considering the reception power of the CPICH transmitted from the macro base station and the path loss reported from the femto terminal. It is possible to reduce downlink cross interference applied from the femto base station to the macro terminal or downlink cross interference applied from the macro base station to the femto terminal by performing the transmission power control in this manner.

CITATION LIST

Patent Literature

PTL 1
U.S. Patent Application Publication No. 2009/0042594
PTL 2
U.S. Patent Application Publication No. 2009/0042596

SUMMARY OF INVENTION

Technical Problem

However, the conventional method of reducing interference described above has the following problems.

(1) When the macro terminal exists in the vicinity of the femto base station, interference therebetween becomes a problem. However, when the macro terminal does not exist in the vicinity of the femto base station, the total transmission power of the fern to base station is reduced more than necessary if the femto base station performs interference control taking the effect to the macro base station into consideration. For this reason, the throughput and the coverage performance of the femto base station are deteriorated. Therefore, it is necessary to establish different solutions for interference control between a case where the macro terminal exists in the vicinity of the femto base station and a case where the macro terminal does not exist in the vicinity of the femto base station.

(2) Seriousness of the interference from the femto base station to the macro terminal depends on the installation location of the femto base station within the macro. First, when the femto base station is installed at a cell edge of the macrocell, the interference problem becomes significant. Therefore, it is necessary to perform the interference control depending on the positional relation between the macro base station and the femto base station.

It is therefore an object of the present invention to provide an interference control method and femto base station that reduce inter-cell interference between the femtocell and the macrocell without deteriorating the throughput and the coverage performance of the femto base station.

Solution to Problem

An interference control method according to the present invention includes a macro terminal detection step of detecting whether there is any macro terminal that is not registered to a femto base station within a communication range (all of the subbands) of the femto base station, and an interference control step, wherein when the macro terminal is detected, interference control is performed by a total transmission power reduction processing or a, frequency division processing, wherein in the total transmission power reduction processing, the total transmission power of the femto base station is reduced, and in the frequency division processing, a frequency different from a frequency used by a macro base station is allocated to a femto terminal registered to the femto base station.

A femto base station according to the present invention includes a macro terminal detection section that detects whether there is any macro terminal that is not registered to a femto base station within a communication range of the femto base station, and an interference control section, wherein when the macro terminal is detected, interference control is performed by a total transmission power reduction processing or a frequency division processing, wherein in the total transmission power reduction processing, the total transmission power of the femto base station is reduced, and in the frequency division processing, a frequency different from a frequency used by a macro base station is allocated to a femto terminal registered to the femto base station.

Advantageous Effects of Invention

According to the present invention, it is possible to provide an interference control method and a femto base station that can reduce inter-cell interference between a femtocell and a macrocell without deteriorating the throughput and the coverage performance of the femto base station.

BRIEF DESCRIPTION OF DRAWINGS

FIG. 5 shows an equation used for determining the determination threshold value.

DESCRIPTION OF EMBODIMENTS

Figure 1:
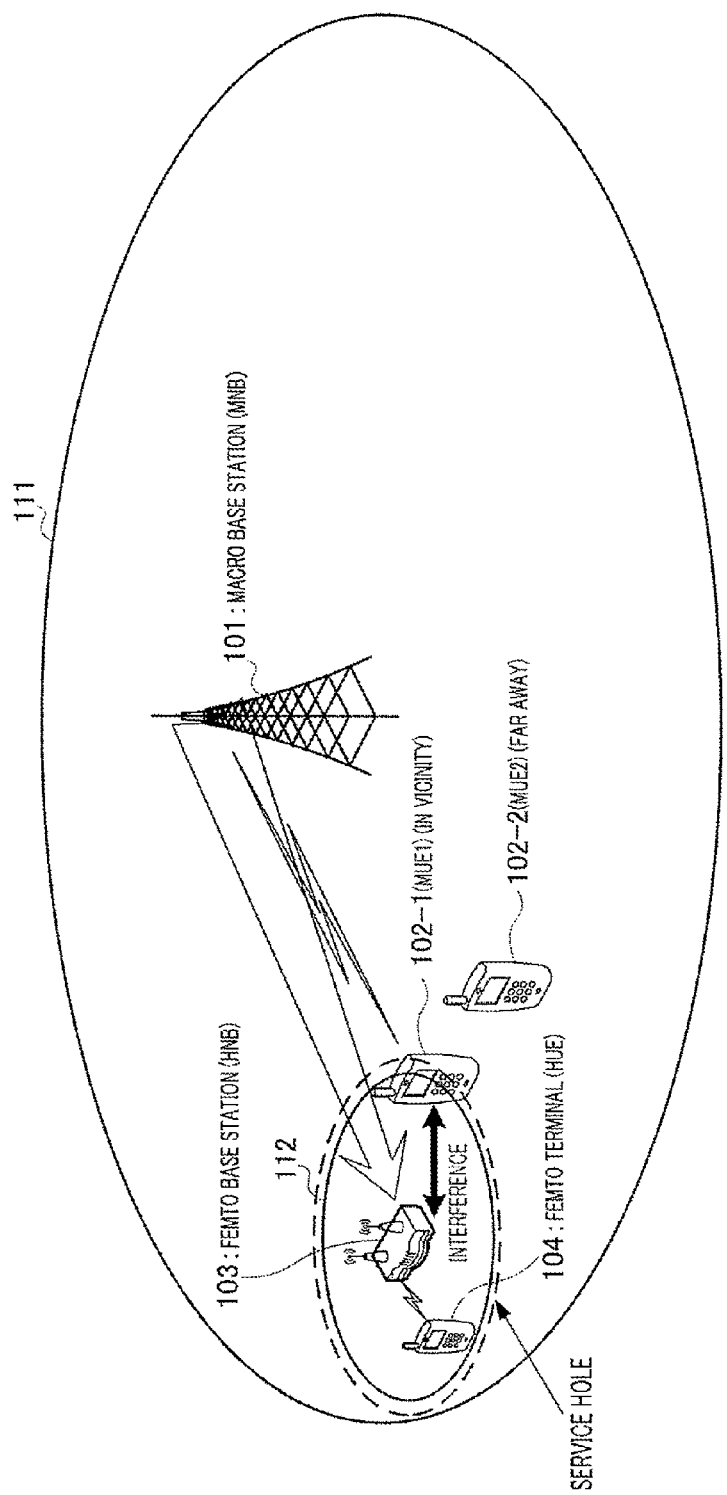
FIG. 1 shows a configuration of a mobile communication system according to Embodiment 1 of the present invention.

Hereinafter, embodiments of the present invention will be explained in detail with reference to the drawings. Here, in embodiments, the same components will be assigned the same reference numerals and repetition of description will be omitted.

Embodiment 1

[Explanation about Principle]

First, a concept of the interference control with detection of a macro terminal in close proximity (a proximate macro terminal) performed by a femto base station will be described.

FIG. 1 shows a configuration of a mobile communication system according to Embodiment 1 of the present invention. FIG. 1 shows a case where a femto base station is deployed in a macrocell covered by a macro base station. one macro base station and one femto base station are deployed in FIG. 1, the number of macro base stations and the number of femto base stations are not limited to this.

In FIG. 1, the mobile communication system includes macro base station 101, macro terminals 102-1 and 102-2, femto base station 103, and femto terminal 104.

Macro base station 101 generally forms one wide macrocell 111 with high transmission power (for example, 43 dBm to 46 dBm at maximum). Macro base station 101 transmits downlink data to macro terminal 102 existing in a macrocell. In addition, macro base station 101 receives uplink data from macro terminal 102 existing in the macrocell. Generally, the macrocell spans several hundred meters to several tens kilometers.

When femto base station 103 is deployed in the macrocell, the maximum transmission power of femto base station 103 is limited to a low value (generally, equal to or smaller than 20 dBm). That is, femto base station 103 forms one small femtocell 112. Femto base station 103 exists in the femtocell, transmits downlink data to femto terminal 104 registered in femto base station 103, and receives uplink data from the corresponding femto terminal 104. Generally, the femtocell spans several meters to several tens meters.

Since the range (that is, the coverage) of the femtocell is defined by a ratio between the desired signal power and the interference power, it significantly depends on setting position of macro base station 101. Generally, the interference power from macro base station 101 is large when femto base station is deployed in close vicinity of macro base station 101 (that is, macro cell site). Therefore, if femto base station 103 is deployed here, the femtocell coverage tends to shrink. Meanwhile, in the macrocell edge, the interference power from macro base station 101 is small. Therefore, if femto base station 103 is deployed here, the femtocell coverage tends to expand.

If femto base station 103 is deployed in the macrocell, femto base station 103 provides one femtocell corresponding to femto terminal 104 and has the advantage that data transmission can be performed with a high bit rate. However, an area suffering large interference is formed in macro terminal 102. Therefore, depending on a condition, there occurs a case where communication of macro terminal 102 is unable due to the large interference from the femtocell. This is called MUE service hole.

In FIG. 1, two macro terminals including macro terminal 102-1 (MUE1) and macro terminal 102-2 (MUE2) exist in macrocell 111. Macro terminal 102-1 and macro terminal 102-2 are terminals not registered to femto base station 103. Macro terminal 102-1 is close to femto base station 103. In other words, macro terminal 102-1 is close to femtocell 112. On the other hand, macro terminal 102-2 is located apart from femto base station 103, and is out of range of femtocell 112. Here, for the downlink interference from femto base station 103 to macro terminal 102, the interference becomes stronger as macro terminal 102 approaches femto base station 103, whereas the interference becomes weaker as macro terminal 102 recedes from femto base station 103.

In FIG. 1, macro terminal 102-1 approaches femto base station 103, and comes close to femtocell 112. This means that macro terminal 102-1 is close to a service hole formed by femto base station 103, and a possibility that macro terminal 102-1 suffers a communication failure increases. For this reason, when macro terminal 102 such as macro terminal 102-1 comes close to femto base station 103, femto base station 103 detects whether or not macro terminal 102 approaches (that is, whether or not there is macro terminal 102 in femtocell 112) and performs the interference control for femto terminal 104 registered to the femto cell.

On the other hand, when a macro terminal exists apart from femto base station 103 as macro terminal 102-2, the interference caused by femto base station 103 is negligibly weak. Therefore, when all macro terminals 102 exist apart from femto base station 103, a necessity for femto base station 103 to perform interference control action such as transmission power reduction or frequency division is low, and there is no need to perform the interference control at all in some cases.

When femto base station 103 performs transmission power reduction action, in femto terminal 104 in the cell of femto base station 103, the femtocell coverage may shrink, or a bit rate may be deteriorated.

If femto base station 103 uses only a part of the frequency due to frequency division or the like, in femto terminal 104 of the host cell, available frequencies may be reduced, or a bit rate may be deteriorated.

Therefore, it is necessary to limit the interference control action taken by femto base station 103 such as transmission power reduction or frequency division to a case where macro terminal 102 exists in the vicinity. Meanwhile, when macro terminal 102 does not exist in the vicinity, if femto base station 103 turns off the interference control or transmits/receives signals by increasing the transmission power or using all frequencies, femto terminal 104 in the cell of femto base station 103 takes advantages that the femtocell expands or the bit rate improves.

[Configuration of Femto Base Station 103]

Figure 2:
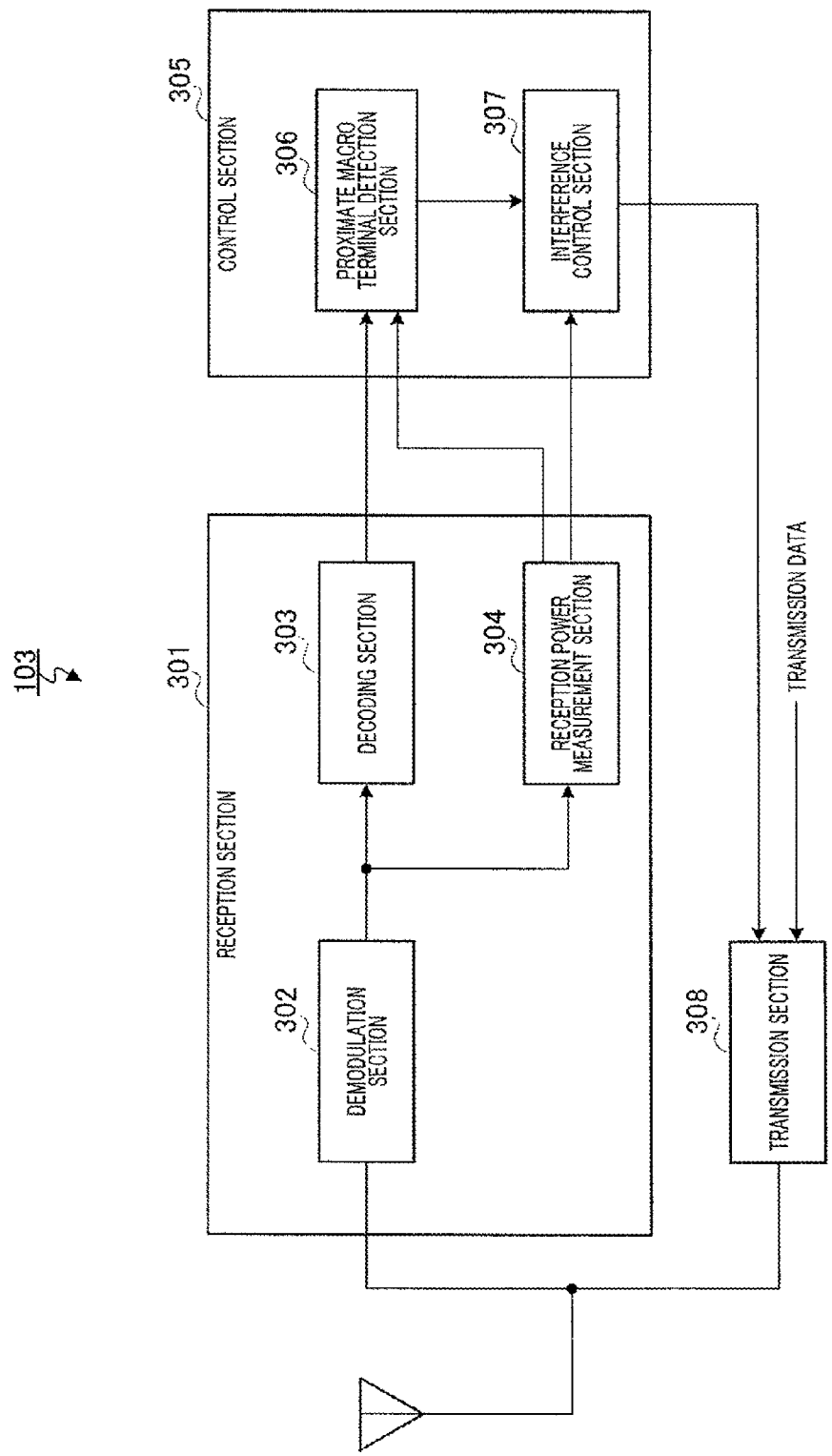
FIG. 2 is a block diagram showing a configuration of a femto base station.

FIG. 2 is a block diagram showing a configuration of femto base station 103. In FIG. 2, femto base station 103 includes reception section 301, control section 305, and transmission section 308.

Reception section 301 performs reception processing on a signal received with an antenna, and measures reception power.

Specifically, reception section 301 includes demodulation section 302, decoding section 303, and reception power measurement section 304.

Demodulation section 302 performs predetermined demodulation on a signal received with an antenna, and outputs the modulated signal to decoding section 303 and reception power measurement section 304.

Decoding section 303 performs predetermined decoding process such as error correction decoding process on the signal that is output from demodulation section 302. When femto base station 103 performs interference control, decoding section 303 decodes broadcast information (broadcast channel (BCH)) from the macro base station or the proximate femto base station, and outputs decoded data to control section 305.

Reception power measurement section 304 uses the signal output from demodulation section 302 to measure reference signal received power (RSRP), and outputs the measurement value to control section 305.

Control section 305 detects macro terminal 102 existing in the vicinity to the femtocell of femto base station 103 as well as performs interference control for reducing interference when macro terminal 102 is detected.

Specifically, control section 305 includes proximate macro terminal detection section 306 and interference control section 307 for performing transmission power control or frequency control.

Proximate macro terminal detection section 306 identifies the maximum measurement value of the reception powers of the reference signals measured by reception power measurement section 304, and detects uplink interference power (uplink interference power (IP) or interference over thermal noise (IoT)) included in the maximum measurement value. Then, proximate macro terminal detection section 306 determines whether or not the interference increases, by comparing the detected interference power with a predetermined threshold value. In other words, the magnitude relation between the interference power and the predetermined threshold value is adopted as a determination criterion when detecting macro terminal 102 existing in the vicinity. Specifically, proximate macro terminal detection section 306 determines that macro terminal 102 exists in the vicinity, if the detected interference power is greater than the predetermined threshold value. On the other hand, proximate macro terminal detection section 306 determines that macro terminal 102 does not exist in the vicinity, if the detected interference power is equal to or smaller than the predetermined threshold value. The uplink interference power described above may be uplink wideband interference power or uplink sub-band interference power. In this case, the uplink sub-band interference power is the interference power for each sub-band of the uplink measured by femto base station 103. IoT represents a ratio between thermal noise and the interference power for each sub-band of the uplink measured by femto base station 103, as dB.

Interference control section 307 uses the above determination criterion to perform interference control. The interference control processing includes a total transmission power reduction processing for reducing the total transmission power of femto base station 103 and frequency division processing for dividing frequencies between the macro and the femto. When the total transmission power reduction processing is performed, interference control section 307 reduces the total transmission power of femto base station 103 for a predetermined time period. On the other hand, when the frequency division processing is performed, interference control section 307 causes a scheduler (not shown) to perform scheduling process so as to allocate another frequency to femto terminal 104 in the cell of femto base station 103, avoiding the frequency used by macro base station 101.

In other words, when proximate macro terminal detection section 306 determines that macro terminal 102 exists in the vicinity, interference control section 307 performs interference control (that is, activates (or turn on) interference control). On the other hand, proximate macro terminal detection section 306 determines that macro terminal 102 does not exist in the vicinity, interference control section 307 deactivates (or turn off) the interference control.

[Operation of Mobile Communication System]

Figure 3:
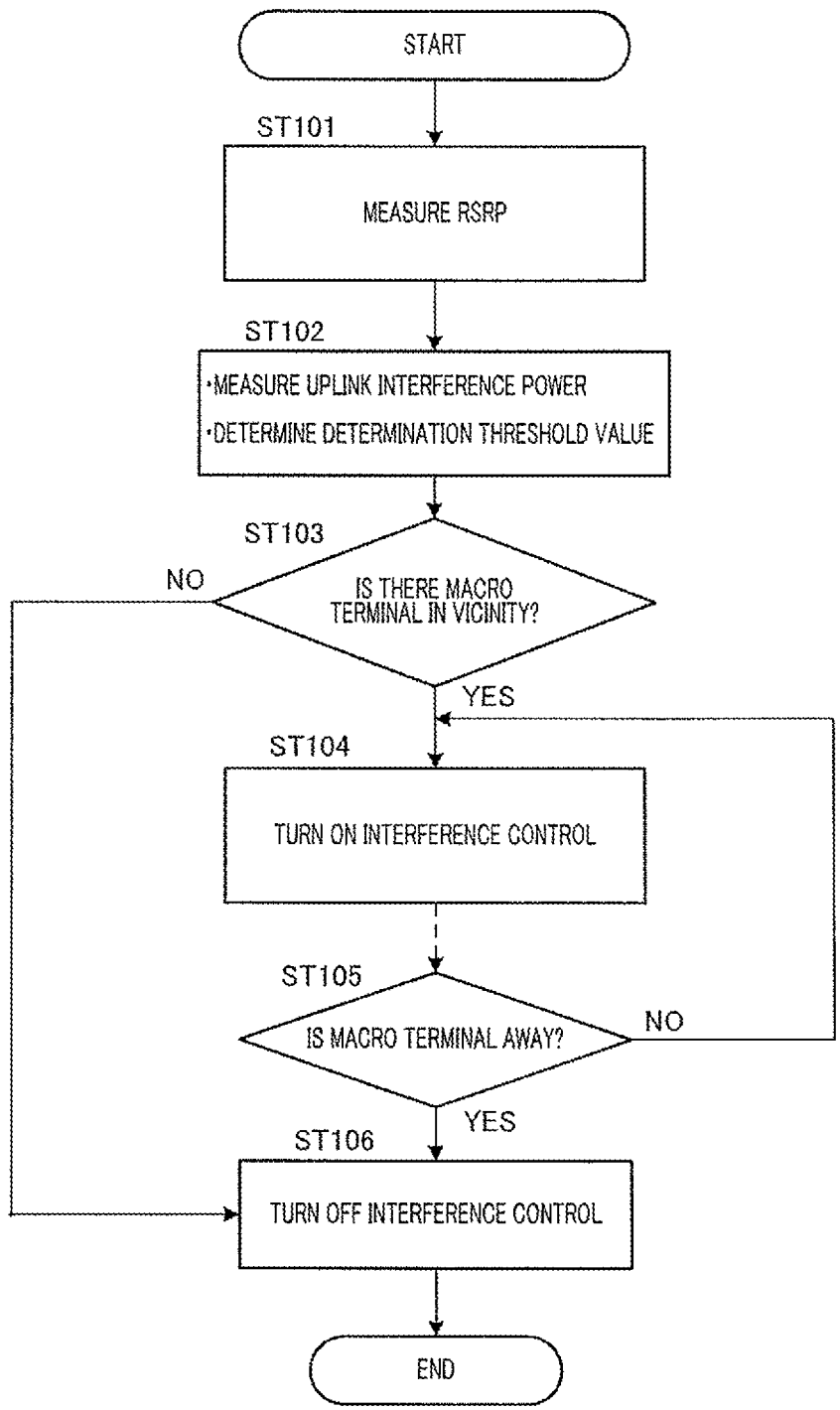
FIG. 3 is an entire processing flow diagram of interference control performed by the femto base station.

FIG. 3 is an entire processing flow diagram of interference control performed by femto base station 103.

In step ST101, femto base station 103 measures the reception power of a reference signal by using terminal detection (UE sniffer) function (that is, function for monitoring the situation of a downlink communication path of macro base station 101). Specifically, reception power measurement section 304 measures the reception power of the reference signal by using the signal output from demodulation section 302. As a modified example, femto base station 103 may instruct femto terminal 104 in the cell of femto base station 103 to measure the reception power of the reference signal, and the reception power of the reference signal transmitted in response to this instruction may be used. As other modified example, femto base station 103 may receive a broadcast channel (BCH) transmitted from macro base station 101 having the highest interference power, measure all information such as the reception power of the reference signal and transmission power absolute value information of a reference signal (RS), and calculate a path loss from macro base station 101.

In step ST102, proximate macro terminal detection section 306 measures the interference power. Specifically, proximate macro terminal detection section 306 identifies the maximum measurement value of the reception powers of the reference signals measured by reception power measurement section 304, and detects interference power included in the maximum measurement value. This measurement is performed when a trigger occurs.

In addition, proximate macro terminal detection section 306 determines the determination threshold value based on the measured interference power (or the path loss from macro base station 101). As described above, the determination threshold value serves as determination criterion for determining whether or not macro terminal 102 exists in the vicinity. Specifically, when femto base station 103 is set at a cell edge of the macrocell, the determination threshold value is a higher value. When femto base station 103 is set in close vicinity of macro base station 101 (that is, macro cell site), the determination threshold value is a lower value.

In step ST103, proximate macro terminal detection section 306 determines whether or not macro terminal 102 exists in the vicinity of femto base station 103. This determination is made based on the measured interference power and the determination threshold value determined in step ST102. Specifically, when the detected interference power is greater than the determination threshold value, proximate macro terminal detection section 306 determines that macro terminal 102 exists in the vicinity. On the other hand, when the detected interference power is equal to or smaller than the determination threshold value, proximate macro terminal detection section 306 determines that macro terminal 102 does not exist in the vicinity. The methods of measuring the interference power, determining the determination threshold value, and detecting the macro terminal will be described later.

When macro terminal 102 is determined to exist in the vicinity in step ST103 (step ST103: YES), interference control section 307 turns on the interference control function in step ST104. In other words, interference control section 307 performs the total transmission power reduction processing or the frequency division processing. It should be noted that only one of the total transmission power reduction processing and frequency division processing may be performed, or both of the total transmission power reduction processing and frequency division processing may be performed.

In step ST105, proximate macro terminal detection section 306 determines whether macro terminal 102 that existed in the vicinity has sufficiently moved away from femto base station 103 (that is, from the femtocell or from the area of the service hole).

When macro terminal 102 is determined not to have moved away in step ST105 (step ST105: NO), the interference control is continued.

On the other hand, when macro terminal 102 is determined to have moved away in step ST105 (step ST105: YES), interference control section 307 deactivates (or turns off) the interference control function (step ST106). Even when macro terminal 102 is determined not to exist in the vicinity in step ST103 (step ST103: NO), the interference control function is deactivated (or turned off).

According to the interference control of the present embodiment, when macro terminal 102 exists in the vicinity to femto base station 103, it is possible to appropriately reduce or prevent the interference to macro terminal 102 at the real time. When macro terminal 102 does not exist in the vicinity to femto base station 103, it is possible to expand the femtocell and improve the bit rate, so that it is possible to prevent unnecessary deterioration of the performance.

<Determination Threshold Value Determining Method>

Figure 4:
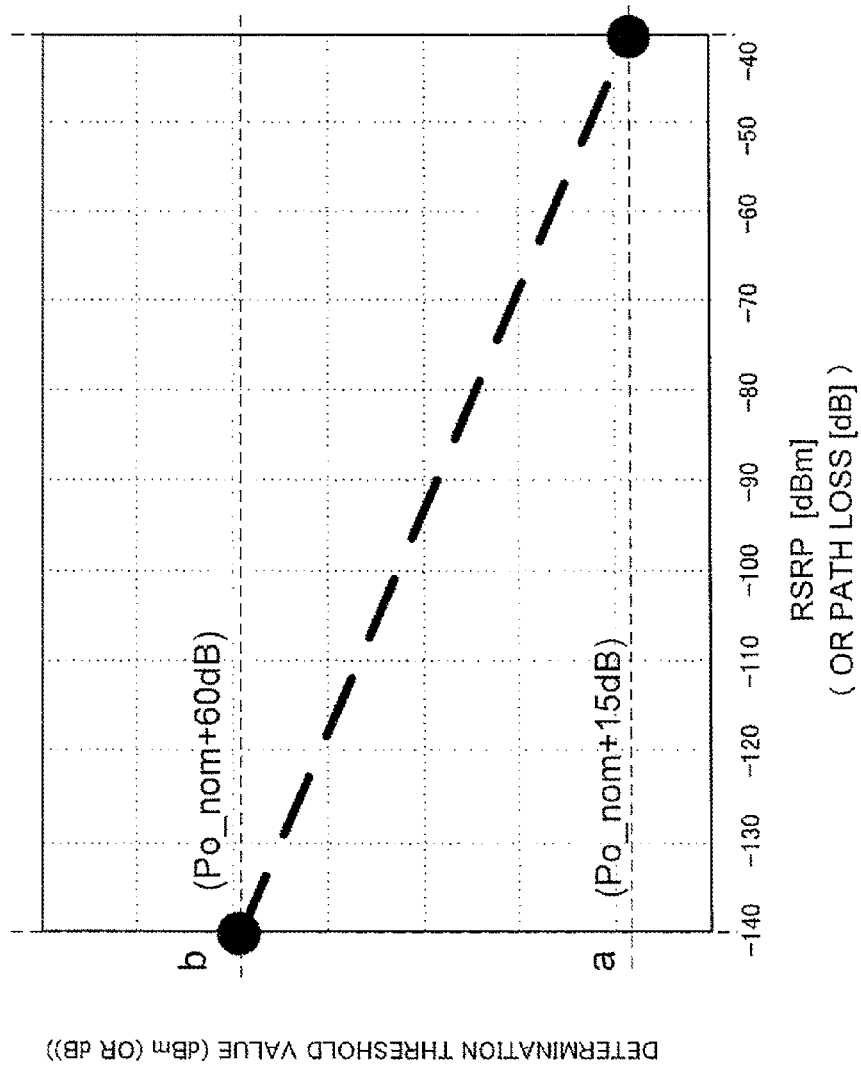
FIG. 4 is a diagram showing a method of determining a determination threshold value.

FIG. 4 is a diagram showing the method of determining the determination threshold value.

First, the focused points will be explained.

The macrocell and the femtocell have the following relationship between the downlink interference and the uplink interference.

(1) The interference of the downlink from femto base station 103 to macro terminal 102 and the interference of the uplink from macro terminal 102 to femto base station 103 have same trend in that the interference of the downlink from femto base station 103 to macro terminal 102 and the interference of the uplink from macro terminal 102 to femto base station 103 increase as femto base station 103 is located closer to the macrocell edge.

(2) The path loss of the downlink between femto base station 103 and macro terminal 102 and the path loss of the uplink between macro terminal 102 and femto base station 103 are about the same.

(3) The path loss of the downlink between macro base station 101 and macro terminal 102 and the path loss of the uplink between macro terminal 102 and macro base station 101 are about the same.

According to the above relationship, when macro terminal 102 comes closer to femto base station 103, the interference power measured by femto base station 103 increases significantly. The increase of the interference power is changed according to the position of the macrocell where femto base station 103 is installed. As the position where femto base station 103 is installed comes closer to the cell edge of the macrocell, the increment of the interference power increases. This is mainly because the difference between the path loss from macro terminal 102 to macro base station 101 and the path loss from macro terminal 102 to femto base station 103 increases, as the position where femto base station 103 is installed comes closer to the cell edge of the macrocell.

Therefore, in the present embodiment, macro terminal 102 existing in the vicinity of femto base station 103 is detected based on the uplink interference power. Specifically, the maximum measurement value of the measured reception power of the reference signals is identified, and the interference power (uplink interference power (IP) or interference over thermal noise (IoT)) included in the maximum measurement value is detected. Then, proximate macro terminal detection section 306 determines whether or not macro terminal 102 exists in the vicinity of femto base station 103, by comparing the detected interference power with the determination threshold value.

The determination, threshold value is set in a variable manner according to the measured reception power of the reference signal (source macro cell RSRP (S-RSRP), depending on the positional relationship of the macrocell and the femtocell). Thus, since the uplink power of macro terminal 102 increases as the position where femto base station 103 is deployed gets closer to the macrocell edge, a mechanism for preventing false detection of macro terminal 102 even in such a case is introduced. Specifically, the determination threshold value is set at a higher value, as the position where femto base station 103 is deployed gets closer to the macrocell edge. It is possible to linearly calculate the determination threshold value according to the reception power (macro RSRP) of the reference signal of the macrocell.

A function used for determining the determination threshold value is calculated, in view of relative positions of macro base station 101, femto base station 103, and macro terminal 102, the difference between the path loss between macro base station 101 and macro terminal 102 and the path loss between femto base station 103 and macro terminal 102, and the coverage of the femtocell.

FIG. 4 shows an example of a function used for determining the determination threshold value. In FIG. 4, the vertical axis denotes an uplink sub-band interference power (IP) threshold value serving as the determination threshold value, and the horizontal axis denotes an RSRP measurement value of macro base station having the largest measured RSRP. This depends on the position where femto base station 103 is deployed in the macrocell. The reception power of the reference signal differs depending on the location within the macrocell, and also directly relates to geographical position (geometry) of macro base station 101. Generally, when the RSRP is high, femto base station 103 or femto terminal 104 is determined to be located in close vicinity of macro base station 101. Meanwhile, generally, when the RSRP is low, femto base station 103 or femto terminal 104 is determined to be located at a cell edge of the macrocell.

<Specific Determining Method of Determination Threshold Value>

The determination threshold value is different according to whether IP is used or IoT is used for the determination. FIG. 5 shows a method of determining and calculating the threshold value where the IP is used.

The calculation procedure of the determination threshold value is as follows.

(1) The reception power at femto base station 103 is calculated from the reception power needed to obtain the reception quality required by macro base station 101, in view of the difference between the path loss from macro terminal 102 to macro base station 101 and the path loss from macro terminal 102 to femto base station 103.

(2) The threshold value of the service hole for macro terminal 102 existing in the vicinity of femto base station 103 is defined, and this threshold value is adopted as a detection request of the service hole. For example, it is possible to use a path loss between macro terminal 102 and femto base station 103, being equal to or smaller than 80 dB, as determination criterion for determining that macro terminal 102 exists in the vicinity of femto base station 103.

(3) The interference power at femto base station 103 is inversely calculated from the above detection request value, and is adopted as the determination threshold value of macro terminal 102 existing in the vicinity of femto base station 103.

Subsequently, each equation shown in FIG. 5 will be explained.

Equation 1 shown in FIG. 5 represents transmission power of macro terminal 102 where the power is controlled by macro base station 101.

In this case, related variables are defined as follows. $P_{O\_NOM}$ denotes a normalized reception power needed by macro base station 101 to receive data channel (PUSCH) of uplink with a predetermined quality. In LTE (TS 36.101), the default value is defined as −100 dBm, where the use bandwidth (BW) of macro terminal 102 is 5 MHz and band 1 defined in RAN4 is used as the carrier frequency. $PL_{MUE\text{-}MNB}$ denotes the path loss between macro terminal 102 and macro base station 101. $PL_{MUE\text{-}HNB}$ denotes the path loss between macro terminal 102 and femto base station 103. $MUE_{MCS}$ denotes an modulation and coding scheme (MCS) of macro terminal 102. MCS corresponds to a CQI index. As macro terminal 102 uses a higher MCS, the required transmission power offset increases. $MUE_{(BW)}$ denotes a bandwidth used by macro terminal 102. As macro terminal 102 uses a wider bandwidth, the required transmission power offset increases. $TH_{HNB\_MUE\_Hole}$ is a detection range of macro terminal 102 existing in the vicinity of femto base station 103, that is, a threshold value defining a service hole for macro terminal 102.

Equation 2 denotes a reception power (that is, interference power) when a signal transmitted from macro terminal 102 is received by femto base station 103 with a transmission power value calculated using equation 1.

Equation 3 is an equation inversely calculating the path loss from macro terminal 102 to femto base station 103, from equation 2.

Equation 4 is an equation for determining the path loss value from macro terminal 102 to femto base station 103, which serves as determination criterion for determining that macro terminal 102 exits in the vicinity of femto base station 103.

<Specific Calculation Method of Interference Power>

Subsequently, a specific example of calculating uplink interference power will be shown.

Generally, in femto base station 103, the use bandwidth and the MCS of macro terminal 102 existing in the vicinity are not known. However, in order to determine the determination threshold value, femto base station 103 needs to estimate the use bandwidth and the MCS of macro terminal 102.

It is possible to calculate or estimate the difference between the path loss from macro terminal 102 to femto base station 103 and the path loss from macro terminal 102 to macro base station 101, generally in view of the distance between macro terminal 102 and femto base station 103, the distance between macro terminal 102 and macro base station 101, propagation path conditions, and the like.

Generally, as an Okumura propagation model, the attenuation of radio wave in a free space is substantially proportional to the fourth-power of the distance in a case of a cellular mobile communication. In other words, the larger the difference between the distance from macro terminal 102 to femto base station 103 and the distance from macro terminal 102 to macro base station 101 is, the larger the difference between the path losses is. Although loss caused by penetration through walls and the like relates, such loss will be omitted here.

In this case, for example, estimation methods performed by femto base station 103 to estimate the use bandwidth and the MCS of proximate macro terminal 102 include two methods as follows.

(Method 1) The use bandwidth (BW) and the MCS of macro terminal 102 are estimated in a fixed manner. For example, it is estimated that the MCS is COI index 5, and the BW is 5 MHz.

(Method 2) The MCS of macro terminal 102 is estimated in an adaptive manner based on the reception power (macro RSRP) of the reference signal measured with the UE Sniffer function. For example, when femto base station is located in close vicinity of macro base station 101, a high CQI index is estimated, and at a macrocell edge, a low CQI index is estimated.

Subsequently, the determination threshold value is specifically calculated using method 2. In particular, where an IP is used for determination, determination threshold values will be respectively calculated for positions in close vicinity of macro base station 101 and at a cell edge. In this case, the follow is assumed. First, the condition indicated by equation 4 is satisfied. Secondly, in case of in close vicinity of macro base station 101, the distance between macro base station 101 and femto base station 103 (distance between M-F) is 50 m, and at the cell edge, the distance between M-F is 500 m.

First, using (method 2), the use bandwidth and the MCS of macro terminal 102 are estimated: in case of in close vicinity of macro base station 101, the MCS is CQI 14 (SINR 17.54 dB); at the cell edge of macro base station, the MCS is CQI 2 (SINR −5.11 dB); and in both cases, the use bandwidth is 5 MHz. Although it is possible to calculate with the same principle even in method 1, the explanation will be omitted here.

It is possible to calculate the path losses and the like using Okumura propagation path, Indoor propagation path model, or the like, under the conditions of positions of in close vicinity of macro base station 101 and at the cell edge.

Then, it is possible to calculate the interference power as equations 5 and 6 below. Equation 5 calculates the interference power concerning the cell edge, and equation 6 calculates the interference power concerning the position of in close vicinity of base station 101.

Equation 5

$$IP_{MUE-HNB\_Cell\_Edge} \approx \quad [1]$$
$$P_{O\_NOM} + (PL_{MUE-MNB} - PL_{MUE-HNB}) + MUE_{MCS} + MUE_{(BW)} \approx$$
$$P_{O\_NOM} + (140 \text{ dB} - 80 \text{ dB}) + (-5.11 \text{ dB}) + 7 \text{ dB} =$$
$$P_{O\_NOM} + 61.89 \text{ dB} \approx P_{O\_NOM} + 60 \text{ dB}$$

Equation 6

$$IP_{MUE-HNB\_Cell\_Site} \approx \quad [2]$$
$$P_{O\_NOM} + (PL_{MUE-MNB} - PL_{MUE-HNB}) + MUE_{MCS} + MUE_{(BW)} \approx$$
$$P_{O\_NOM} + (70 \text{ dB} - 80 \text{ dB}) + (17.54 \text{ dB}) + 7 \text{ dB} =$$
$$P_{O\_NOM} + 14.54 \text{ dB} \approx P_{O\_NOM} + 15 \text{ dB}$$

As described above, the interference power at the cell edge is about $P_{O\_NOM}+60$ dB. The interference power immediately under macro base station 101 is $P_{O\_NOM}+15$ dB. These interference powers are used as the determination threshold values.

Then, as shown in FIG. 4, it is possible to calculate in a linear manner the interference power between the positions in close vicinity of macro base station 101 and at the cell edge (that is, range where the RSRP of FIG. 4 is between −140 dBm and −40 dBm). It is equally possible to provide predetermined margins for the calculated determination threshold values.

By setting as above, when macro terminal 102 exists in the vicinity of femto base station 103, it is possible to accurately reduce the interference to macro terminal 102 at the real time. When macro terminal 102 does not exist in the vicinity of femto base station 103 or when macro terminal 102 moves away from the vicinity of femto base station, it is possible to expand the femtocell and improve the bit rate, so that it is possible to prevent unnecessary deterioration of the performance.

Embodiment 2

In Embodiment 2, when the determination threshold value is determined, the range where femto base station 103 is deployed in the area of macro base station 101 or the reception power of the reference signal range (macro RSRP range) measured by femto terminal 104 is further divided into a plurality of sections, and optimal determination threshold values are calculated according to each of the sections.

Figure 6:
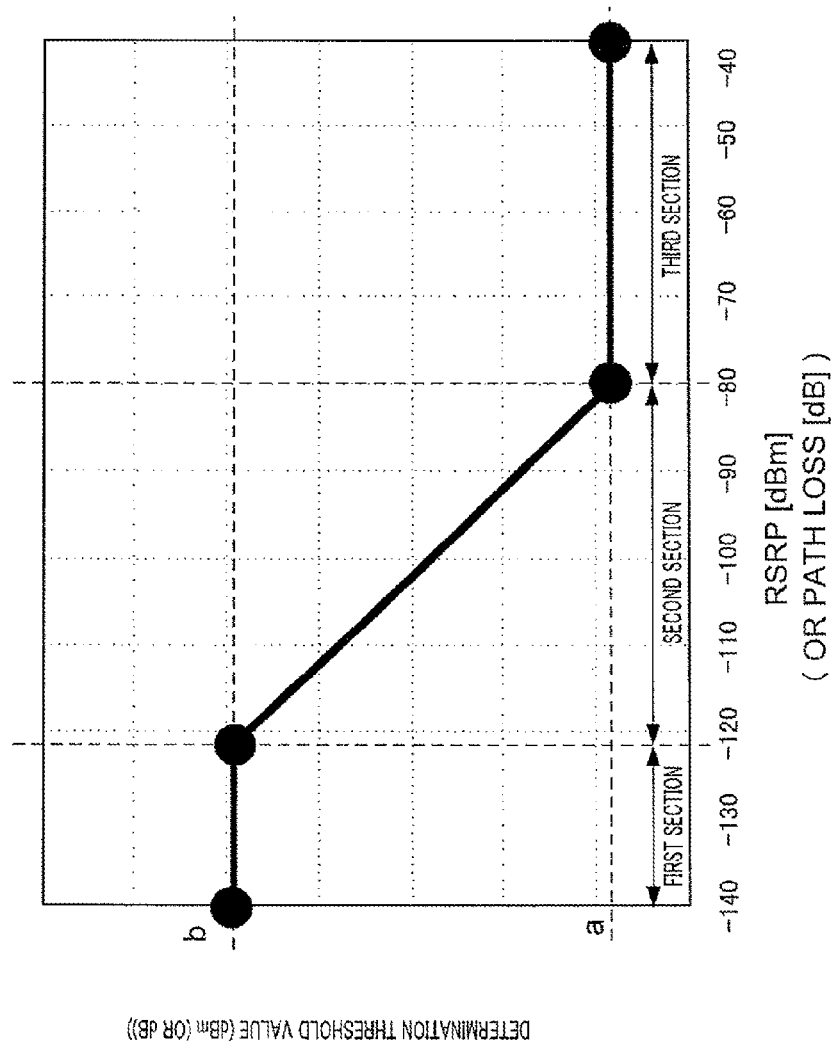
FIG. 6 shows a method of determining a determination threshold value according to Embodiment 2 of the present invention.

FIG. 6 shows a method of determining a determination threshold value. In FIG. 6, the horizontal axis denotes an RSRP measurement value of a macro base station having the largest measured RSRP. The vertical axis denotes an uplink sub-band interference power threshold value (uplink sub-band interference power (IP) threshold) serving as the determination threshold value.

The determination threshold value is set in a variable manner according to the measured reception power of the reference signal (source macro cell RSRP (S-RSRP), depending on the positional relationship of the macrocell and the femtocell). At a cell edge, the determination threshold value is set at a low value in order to activate the interference control more easily.

The determination threshold value is calculated in each of the plurality of sections in view of the position of femto base station 103 in the area of macro base station 101. As one example, there is a method for dividing into three sections, that is, a section in close vicinity of macro base station 101 (macro cell site), a cell central range (macro middle range), and a cell edge (macrocell edge). As another example, there is a method for dividing the reception power range of the reference signal (macro RSRP range) into three sections, that is, −140 dBm to 120 dBm, −120 dBm to 80 dBm, and −80 dBm to 40 dBm.

As shown in FIG. 6, the determination threshold value of the first section is determined according to the upper limit of the physical transmission/reception power dynamic range of the sub-band of femto base station 103.

A section in which the reception power of the reference signal (M_RSRP) is −80 dBm or more (the third section of FIG. 6) is defined as a region in close vicinity to macro base station 101. In this region, the strength of the signal from macro base station 101 is high, and therefore, the downlink interference control cannot be activated easily. The criterion of determination in the region in close vicinity to macro base station 101 may be set as a predetermined line-of-sight distance from macro base station 101 (150 m) or less according to radio link simulation (link simulation).

Like Embodiment 1, the determination threshold value of the second section is determined using a linear calculation method.

A function of the determination threshold value versus the reception power of the reference signal (S-RSRP) is calculated in view of relative positions of macro base station 101, femto base station 103, and macro terminal 102, the difference between the path loss from macro terminal 102 to macro base station 101 and the path loss from macro terminal 102 to femto base station 103, and the coverage of the femtocell.

By setting as above, when macro terminal 102 exists in the vicinity of femto base station 103, it is possible to accurately reduce the interference to macro terminal 102 at the real time. When macro terminal 102 does not exist in the vicinity to femto base station 103 or when macro terminal 102 moves away from the vicinity of femto base station, it is possible to expand the femtocell and improve the bit rate, so that it is possible to prevent unnecessary, deterioration of the performance. In addition, when the interference from macro terminal 102 to femto base station 103 and the interference from femto base station 103 to macro terminal 102 are high, it is possible to activate the interference control more easily.

Embodiment 3

Embodiment 3 is the same as Embodiment 2 in that the reception power range is divided to a plurality of sections, but Embodiment 3 is different from Embodiment 2 in that the method of determining the determination threshold values of the plurality of sections is simplified. Specifically, the determination threshold value is a constant value of each section.

Figure 7:
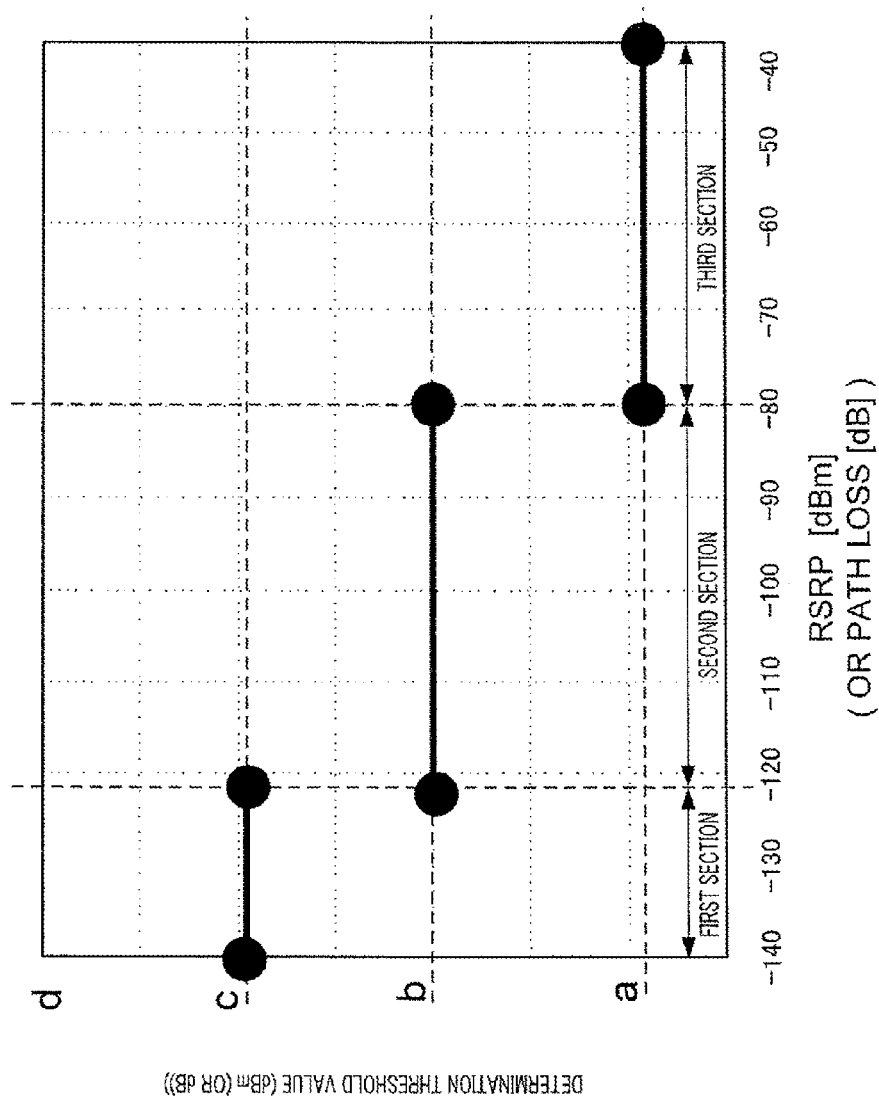
FIG. 7 shows a method of determining a determination threshold value according to Embodiment 3 of the present invention.

FIG. 7 shows a method of determining a determination threshold value. In FIG. 7, the horizontal axis denotes an RSRP measurement value of a macro base station having the largest measured RSRP. The vertical axis denotes an uplink sub-band interference power threshold value (uplink sub-band interference power (IP) threshold) serving as the determination threshold value.

The determination threshold value is set in a variable manner according to the measured reception power of the reference signal (source macro cell RSRP (S-RSRP), depending on the positional relationship of the macrocell and the femtocell). At a cell edge, the determination threshold value is set at a low value in order to activate the interference control more easily.

The determination threshold value is respectively calculated for a plurality of sections considering the position of femto base station 103 in the area of macro base station 101. As one example, there is a method for dividing into three sections, that is, a section in close vicinity of macro base station 101 (macro cell site), a cell central range (macro middle range), and a cell edge (macrocell edge). As other example, there is a method for dividing the reception power range of the reference signal (macro RSRP range) into three sections, that is, −140 dBm to 120 dBm, −120 dBm to 80 dBm, and −80 dBm to 40 dBm.

In each of the three sections, the determination threshold value is set at a constant value in order to simplify the process. FIG. 7 divides the RSRP reception power range into three sections, and a constant threshold value is given to each section. In other words, FIG. 7 shows a concept of three-stage of determination threshold value.

Figure 8:
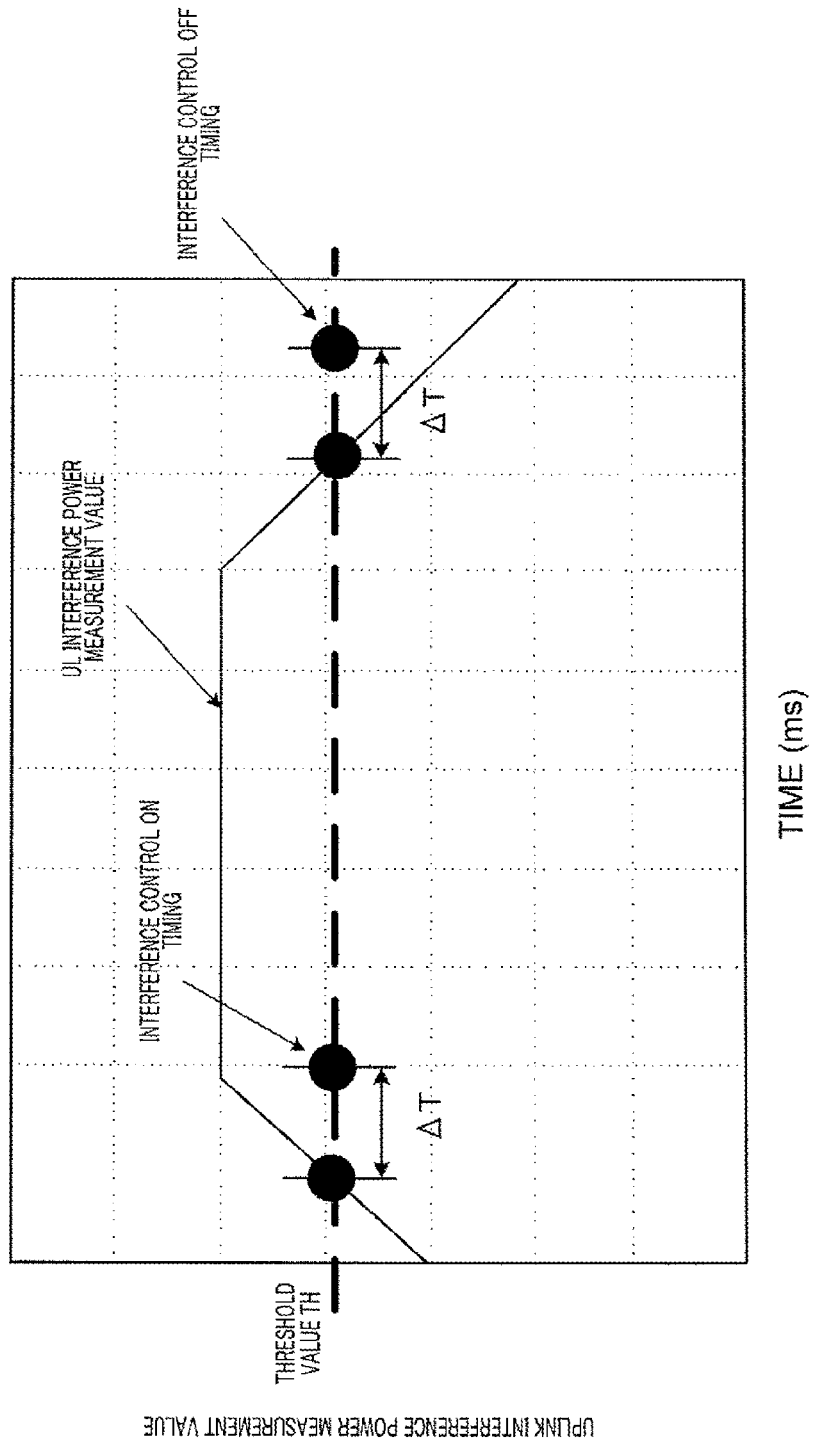
FIG. 8 is a timing diagram in detection processing of a macro terminal by the determination threshold value.

FIG. 8 is a timing diagram in detection processing of macro terminal 102 by the determination threshold value. In FIG. 8, the horizontal axis denotes a time axis, and the vertical axis denotes a measurement value of an uplink sub-band interference power (IP). The interference control section 307 turns on the interference control when an elapsed time since the measured uplink sub-band interference power becomes greater than the determination threshold value is equal to or more than ΔT. On the other hand, when the elapsed time since the measured uplink sub-band interference power becomes less than the determination threshold value is equal to or more than ΔT, the interference control is turned off. By using the time interval ΔT as described above, it is possible to average the reception power of the reference signal (RSRP) for a longer period of time, so that it is possible to reduce the false detection rate of macro terminal 102.

By setting as above, when macro terminal 102 exists in the vicinity of femto base station 103, it is possible to accurately reduce the interference to macro terminal 102 at the real time. When macro terminal 102 does not exist in the vicinity to femto base station 103 or when macro terminal 102 moves away from the vicinity of femto base station, it is possible to expand the femtocell and improve the bit rate, so that it is possible to prevent unnecessary deterioration of the performance. In addition, when the interference from macro terminal 102 to femto base station 103 and the interference from femto base station 103 to macro terminal 102 are high, it is possible to activate the interference control more easily. In addition, the method of determining the determination threshold value can be simplified.

Embodiment 4

Embodiment 4 provides two uplink interference value threshold values for detecting macro terminal, detects distinctly a medium level interference and a higher level interference, which are at different levels in the amount of interference, switches the power control and the frequency division in the femto base station, according to the magnitude of the amount of interference respectively. According to this method, it is possible to perform a more appropriate interference control according to different levels of interferences. Since the basic configuration of the femto base station according to Embodiment 4 is the same as that of femto base station 103 according to Embodiment 1, the configuration will be explained with reference of FIG. 2.

For example, the interference that the macro terminal receives is significantly different, according to whether the macro terminal is outdoors outside of a room in which the femto is installed or the macro terminal is indoors. This is because when the macro terminal is outdoors, the interference caused by femto base station 103 may be attenuated and reduced due to the loss caused by the walls (penetration loss), and the desired signal power transmitted from the macro base station may reach without any attenuation due to the loss caused by the walls of the room in which the femto is installed.

On the other hand, when the macro terminal is indoors, the interference caused by femto base station 103 increases without any attenuation equivalent to the loss caused by the walls, and the desired signal power transmitted from the macro base station is attenuated due to the loss caused by the walls, so that the SINR is deteriorated. For this reason, when the macro terminal is indoors, the amount of interference greatly increases as compared with the case where the macro terminal is outdoors.

Likewise, the amount of interference caused by the macro terminal to the uplink to the fern to base station 103 is greatly different according to whether the macro terminal is outdoors outside of the room in which the femto is installed or the macro terminal is indoors. When the macro terminal is indoors, the interference caused by the macro terminal to femto base station 103 greatly increases as compared with the case where the macro terminal is outdoors.

As described above, when the macro terminal is indoors; the interference of the uplink received by the femto is high interference. In such case, the method in which different frequencies are used by femto base station 103 and the macro terminal in question, that is, the method of frequency division, is more effective than the method of transmission power control. This is because when the interference is extremely high, the frequency used by the macro terminal is simultaneously used by femto base station 103 in the method of transmission power control, and this makes it difficult to completely eliminate the interference caused by the frequency of femto base station 103 to the macro terminal, which may disconnect the connection of the macro terminal.

Figure 9:
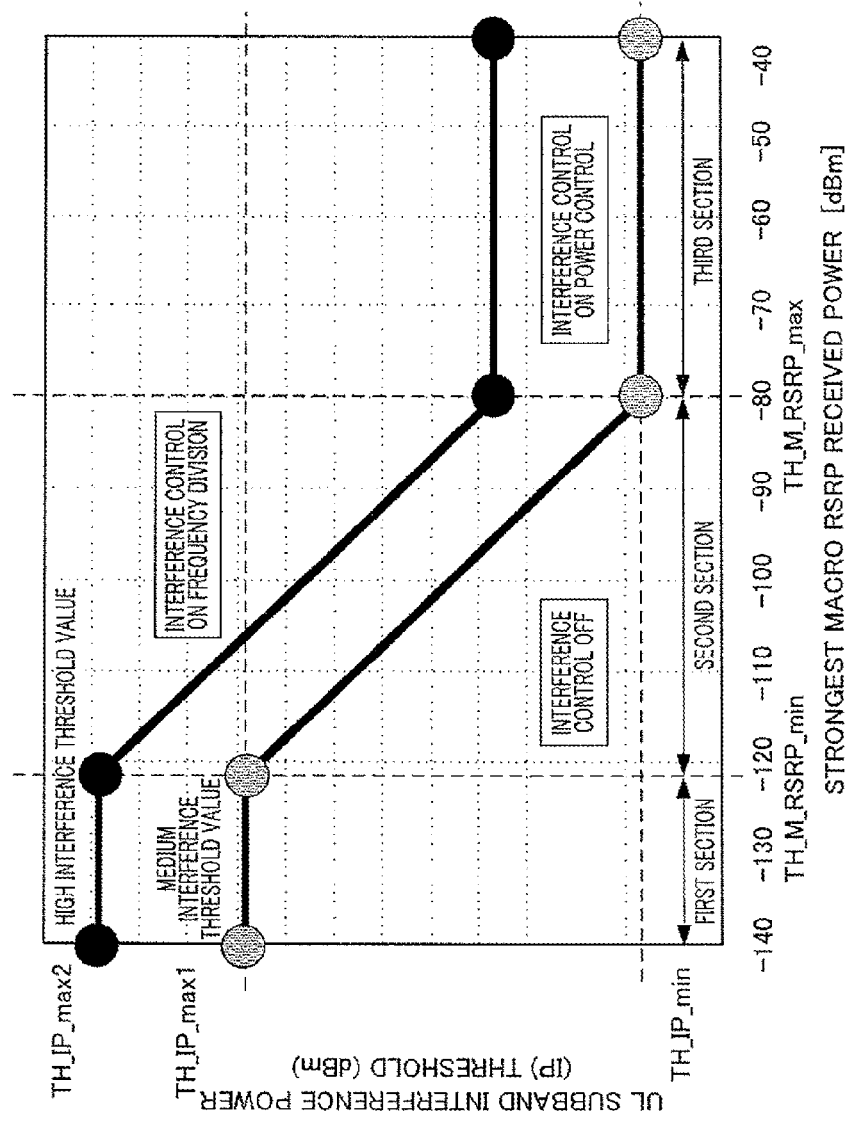
FIG. 9 shows a method for switching between transmission power control and frequency division, using two threshold values according to Embodiment 4 of the present invention.

FIG. 9 shows a method for switching between transmission power control and frequency division, using two threshold values.

Femto base station 103 uses two threshold values (that is, first threshold value (middle) and second threshold value (high)) to measure the interference of the uplink. If the measured interference power is greater than the first threshold value and is less than the second threshold value, femto base station 103 determines that the interference is about medium level, and accordingly, performs the transmission power control. If the measured interference power is greater than the second threshold value, femto base station 103 determines that the interference is high, and accordingly, performs the frequency division. If the measured interference power is less than the first threshold value, femto base station 103 turns off the interference control, and performs neither the transmission power control nor the frequency division.

Figure 10:
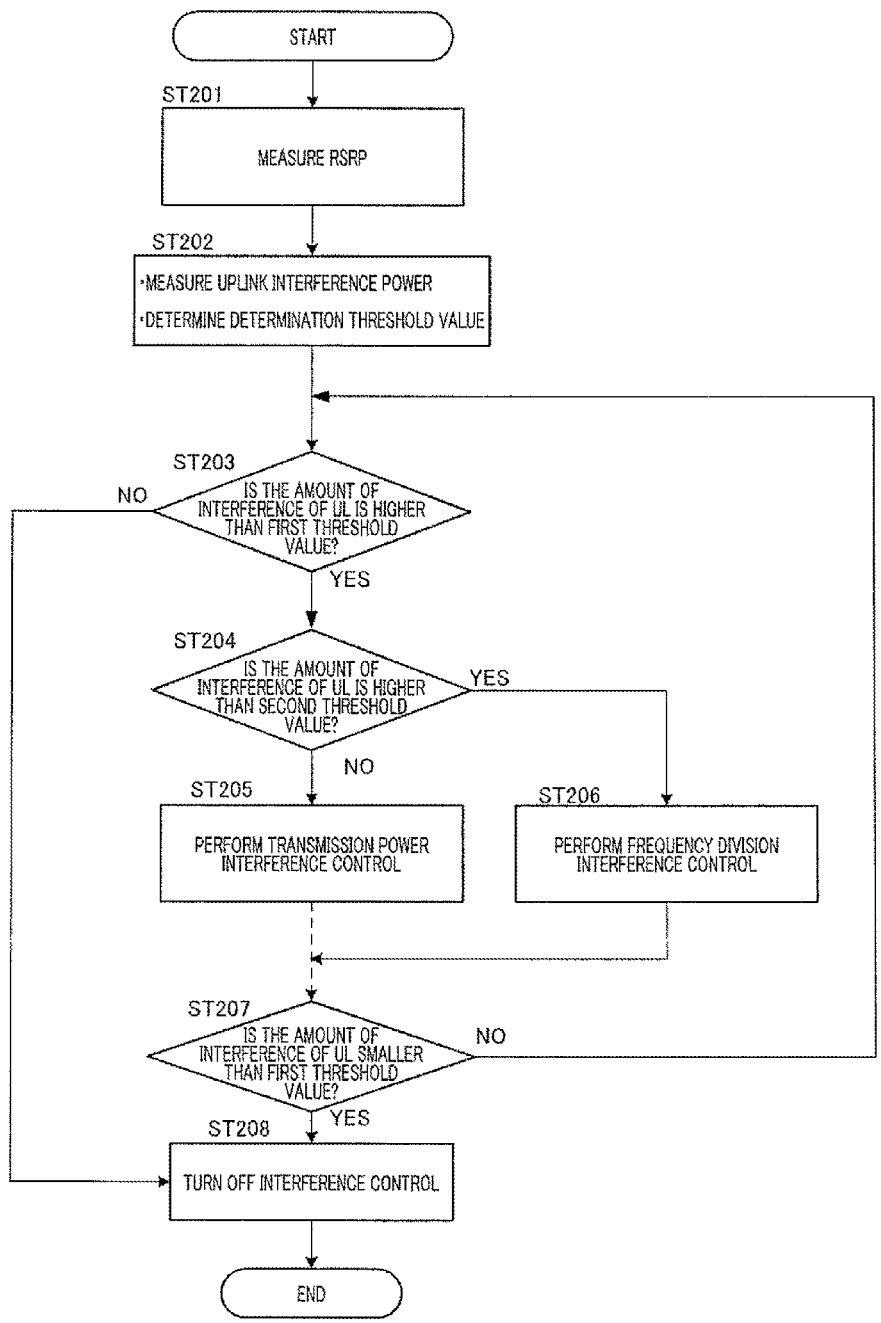
FIG. 10 is a flow diagram showing a switching control processing for switching between transmission power control and frequency division performed by the femto base station.

FIG. 10 is a flow diagram showing a switching control processing for switching between the transmission power control and the frequency division performed by femto base station 103.

The operation of step ST201 is the same as that of step ST101 of Embodiment 1.

The operation of step ST202 is about the same as that of step ST102 of Embodiment 1. However, in step ST202, two uplink threshold values for the amount of interference (that is, first threshold value (medium), second threshold value (high)), are set.

The operation of step ST208 is the same as that of step ST106 of Embodiment 1. The explanation about step ST201, step ST202, and step ST208 will be omitted here. In step ST203, proximate macro terminal detection section 306 measures the uplink interference, compares the uplink interference with the first threshold value, and determines the result thereof. When the measured interference power is greater than the first threshold value (step ST203: YES), step ST204 is subsequently performed. On the other hand, when the measured interference power is less than the first threshold value (step ST203: NO), step ST208 is subsequently performed, and interference control section 307 turns off the interference control. In step ST204, proximate macro terminal detection section 306 compares the measurement value of the uplink interference with the second threshold value, and determines the result thereof. When the measured interference power is less than the second threshold value (step ST204: NO), step ST205 is subsequently performed, and interference control section 307 performs the transmission power interference control. On the other hand, the measured interference power is greater than the second threshold value (step ST204: YES), interference control section 307 performs the frequency division interference control in step ST206.

In step ST205, femto base station 103 controls the transmission power of femto base station 103 so as not to give high interference to the proximate macro terminal. In one of control methods, femto base station 103 measures the highest RSRP reception power of the macro base station, and the transmission power is determined based on the RSRP reception power. Generally, when the RSRP reception power of the macro base station is high, femto base station 103 sets a relatively high transmission power according to the RSRP reception power. When the RSRP reception power of the macro base station is low, femto base station 103 sets a relatively low transmission power according to the RSRP reception power. The details thereof will be omitted here.

In step ST206, femto base station 103 sets different frequencies so that the frequency used between femto base station 103 and the femto terminal and the frequency used by the proximate macro terminal are not the same frequency as each other, so as not to give interference to the macro terminal coming into the room in which the femto is installed, for example. In this case, this interference control method is referred to as the macro-femto frequency division method.

In one of methods for achieving the macro-femto frequency division method, femto base station 103 uses a sub-band CQI report reported by the femto terminal, uses only the sub-band of good CQI report, and does not use the sub-band of bad CQI report so that the sub-band is left open for the macro terminal.

Specifically, based on the CQI report provided by the femto terminal (or SINR information about each sub-band measured with the UE sniffer function by femto base station 103), femto base station 103 performs scheduling process, and selects a sub-band in a frequency region or a resource block (RB).

The UE sniffer function is a function of femto base station 103 for receiving the RSRP reception power of the pilot signal of the downlink transmitted from the macro base station and the system information of the broadcast channel (BCH).

For example, when the CQI report from the femto terminal is used, the femto terminal measures the CQIs of all the frequency sub-bands, and among them, a CQI or an MCS of a sub-band having the best SINR, MCS (Modulation & Coding Scheme) is reported. Femto base station 103 selects a sub-band whose communication quality is the best, and performs scheduling. On the other hand, frequency sub-bands whose SINR (or MCS) is bad is not used, or the transmission power of the sub-band whose SINR (or MCS) is bad is reduced although the use of the sub-band is permitted. The details thereof will be omitted here.

In step ST207, proximate macro terminal detection section 306 determines whether macro terminal 102 that existed in the vicinity has sufficiently moved away from femto base station 103 (that is, from the femtocell or from the area of the service hole). Specifically, proximate macro terminal detection section 306 measures the uplink interference, compares the uplink interference with the first threshold value, and determines whether the uplink interference is less than the first threshold value.

When macro terminal 102 is determined not to have moved away in step ST207 (that is, the amount of interference of the uplink is higher than the first threshold value), the interference control is continued.

On the other hand, when macro terminal 102 is determined to have moved away in step ST207, interference control section 307 deactivates (or turns off) the interference control function (step ST208). It should be noted that even when macro terminal 102 is determined not to exist in the vicinity in step ST203 (step ST203: NO), the interference control function is deactivated (or turned off).

As described above, according to the interference control of the present Embodiment, two uplink interference value threshold values for detecting macro terminal are provided, and a medium level interference and an extremely high level interference (high interference), which are at different levels in the amount of interference, are distinguished and detected. According to the magnitude of the amount of interference of each of them, femto base station 103 switches the power control and the frequency division. Therefore, more appropriate interference control can be performed according to different levels of interferences, which may occur when, e.g., the macro terminal is indoors or outdoors of the room where femto base station 103 is installed. This enables efficient reduction of the interference to the macro terminal, and the throughput of the macro terminal is expected to improve.

Each embodiment mentioned above explains an example when the present invention is performed by hardware, but the present invention can be implemented with software.

Furthermore, each function block employed in the description of each of the aforementioned embodiments may typically be implemented as an LSI constituted by an integrated circuit. These may be individual chips or partially or totally contained on a single chip. "LSI" is adopted here but this may also be referred to as "IC," "system LSI," "super LSI," or "ultra LSI" depending on differing extents of integration.

Further, the method of circuit integration is not limited to LSI's, and implementation using dedicated circuitry or general purpose processors is also possible. After LSI manufacture, utilization of an FPGA (Field Programmable Gate Array) or a reconfigurable processor where connections and settings of circuit cells in an LSI can be regenerated is also possible.

Further, if integrated circuit technology comes out to replace LSI's as a result of the advancement of semiconductor technology or a derivative other technology, it is naturally also possible to carry out function block integration using this technology. Application of biotechnology is also possible.

The contents of disclosure of the specification, the drawings, and the abstract included in the Japanese Patent Application No. 2009-190432 filed on Aug. 19, 2009, are all incorporated herein by reference.

INDUSTRIAL APPLICABILITY

The interference control method and the femto base station according to the present invention are effective for reducing inter-cell interference between a femtocell and a macrocell without deteriorating the coverage performance and the throughput of the femto base station.

REFERENCE SIGNS LIST

101 Macro base station
102 Macro terminal
103 Femto base station
104 Femto terminal
301 Reception section
302 Demodulation section
303 Decoding section
304 Reception power measurement section
305 Control section
306 Proximate macro terminal detection section
307 Interference control section
308 Transmission section

The invention claimed is:

1. An interference control method comprising:
measuring, at a femto base station, an interference power of an uplink transmission from a macro terminal to a macro base station, the macro terminal not being registered to the femto base station; and
detecting whether the macro terminal is within a communication range of the femto base station by comparing the measured interference power with a threshold value, wherein interference control is performed by a total transmission power reduction processing or a frequency division processing when the macro terminal is detected and the interference control is deactivated when the macro terminal is not detected, and
wherein in the total transmission power reduction processing, the total transmission power of the femto base station is reduced, and in the frequency division processing, a frequency different from a frequency used by the macro base station is allocated to a femto terminal registered to the femto base station.

2. The interference control method according to claim 1, wherein a highest interference power of the uplink transmission within the communication range of the femto base station is measured, and when the measured interference power is higher than the threshold value, presence of the macro terminal is detected.

3. The interference control method according to claim 2, wherein a highest reception power of a reference signal (reference signal received power (RSRP)) of the macro base station is measured, and the measured RSRP is used to determine the threshold value.

4. The interference control method according to claim 3, wherein the lower the measured RSRP of the macro base station is, the higher the threshold value is set, or the higher the measured RSRP of the macro base station is, the lower the threshold value is set.

5. The interference control method according to claim 3, wherein the threshold value is determined in each of a plurality of sections obtained by dividing a range of reference signal received power.

6. The interference control method according to claim 2, wherein the interference power is calculated according to an equation below, $$IP_{MUE\text{-}HNB} \approx P_{O\_NOM} + (PL_{MUE\text{-}MNB} - PL_{MUE\text{-}HNB}) + MUE_{MCS} + MUE_{(BW)}$$

where $P_{O\_NOM}$ denotes a normalized reception power needed by the macro base station to receive data channel of uplink with a required quality, $PL_{MUE\text{-}MNB}$ is a path loss between the macro terminal and the macro base station, $PL_{MUE\text{-}HNB}$ is a path loss between the macro terminal and the femto base station, $MUE_{MCS}$ is an MCS (Modulation and Coding Scheme) of the macro terminal, and $MUE_{(BW)}$ is a bandwidth used by the macro terminal.

7. The interference control method according to claim 2, wherein the threshold value is determined based on a difference between a path loss from the macro terminal to the macro base station and a path loss from the macro terminal to the femto base station.

8. The interference control method according to claim 2, wherein the measured interference power is compared with the threshold value, the interference control is turned on when an elapsed time since the measured interference power becomes more than the threshold value is equal to or more than a predetermined time $\Delta T$, and the interference control is turned off when the elapsed time since the measured interference power becomes less than the threshold value is equal to or more than a predetermined time $\Delta T$.

9. The interference control method according to claim 1, wherein a highest interference power of the uplink transmission within the communication range of the femto base station is measured, and the measured interference power is compared with a first threshold value and a second threshold value which are different from an amount of interference set in advance, and based on a result of the comparison, when the measured interference power is higher than the first threshold value, the interference control is performed by the total transmission power reduction processing, and when the measured interference power is higher than the second threshold value, the interference control is performed by the frequency division processing.

10. A femto base station comprising:
    a measurement section that measures an interference power of an uplink transmission from a macro terminal to a macro base station, the macro terminal not being registered to the femto base station;
    a macro terminal detection section that detects whether the macro terminal is within a communication range of the femto base station by comparing the measured interference power with a threshold value; and
    an interference control section,
    wherein interference control is performed by a total transmission power reduction processing or a frequency division processing when the macro terminal is detected, and the interference control is deactivated when the macro terminal is not detected, and
    wherein in the total transmission power reduction processing, the total transmission power of the femto base station is reduced, and in the frequency division processing, a frequency different from a frequency used by the macro base station is allocated to a femto terminal registered to the femto base station.

11. The femto base station according to claim 10, wherein in the macro terminal detection section, a highest interference power of the uplink transmission within the communication range of the femto base station is measured, and in the interference control section, the measured interference power is compared with a first threshold value and a second threshold value which are different from an amount of interference set in advance, and based on a result of the comparison, when the measured interference power is higher than the first threshold value, the interference control is performed by the total transmission power reduction processing, and when the measured interference power is higher than the second threshold value, the interference control is performed by the frequency division processing.

* * * * *